(12) United States Patent
Faillat et al.

(10) Patent No.: US 8,225,812 B2
(45) Date of Patent: Jul. 24, 2012

(54) SLAM SHUT SAFETY DEVICE

(75) Inventors: Claude Faillat, Evry (FR); Arnaud Bourgeois, Luisant (FR); Guillaume Fournel, Rambouillet (FR)

(73) Assignee: Fisher Controls International LLC, St. Louis, MO (US)

( * ) Notice: Subject to any disclaimer, the term of this patent is extended or adjusted under 35 U.S.C. 154(b) by 1075 days.

(21) Appl. No.: 12/105,351

(22) Filed: Apr. 18, 2008

(65) Prior Publication Data

US 2008/0257420 A1 Oct. 23, 2008

Related U.S. Application Data

(60) Provisional application No. 60/925,599, filed on Apr. 20, 2007.

(30) Foreign Application Priority Data

Apr. 20, 2007 (FR) ...................................... 07 54624

(51) Int. Cl.
*F16K 17/20* (2006.01)

(52) U.S. Cl. ........ 137/463; 137/460; 137/553; 251/331; 92/104

(58) Field of Classification Search .................. 137/269, 137/271, 456, 458, 460, 463, 553; 251/331, 251/61.2, 61.5; 92/96, 105, 104
See application file for complete search history.

(56) References Cited

U.S. PATENT DOCUMENTS

| | | | |
|---|---|---|---|
| 2,489,596 A * | 11/1949 | Swain et al. ................ | 251/321 |
| 2,665,714 A | 1/1954 | Greenwood | |
| 2,673,707 A | 3/1954 | McRae | |
| 3,209,773 A | 10/1965 | Klaus | |
| 3,422,841 A | 1/1969 | Farrer | |
| 3,429,321 A | 2/1969 | Thrall | |
| 3,434,395 A * | 3/1969 | Londal ........................... | 92/6 R |

(Continued)

FOREIGN PATENT DOCUMENTS

DE 87 00 583 U1 2/1987

(Continued)

OTHER PUBLICATIONS

EPO Translation of German Patent Publication DE19952610, Published May 25, 2000.*

(Continued)

*Primary Examiner* — Kevin Lee
*Assistant Examiner* — Macade Brown
(74) *Attorney, Agent, or Firm* — Marshall, Gerstein & Borun LLP

(57) ABSTRACT

A safety device for a gas distribution system includes a valve body, an upper casing attached to the valve body, the upper casing housing two springs. The two springs are co-axially located and separated by a casting tube. Further, the two springs are attached to a movable diaphragm that is exposed to gas system pressure. A snap ring flange is also attached to the valve body, the snap ring flange being used to secure the safety device to a main regulator in the gas distribution system. The valve body also includes a cam mounted within the valve body. A limit switch is directly connected to the cam such that the limit switch moves directly in response to movement of the diaphragm. Additionally, a reset pin extends from the valve body and interacts with the cam such that the cam may be reset from a closed position to an open position by moving the reset pin.

13 Claims, 5 Drawing Sheets

U.S. PATENT DOCUMENTS

| | | | |
|---|---|---|---|
| 3,463,346 A * | 8/1969 | Mitchell | 220/203.14 |
| 3,602,249 A | 8/1971 | Zingg | |
| 3,633,416 A | 1/1972 | Van Dyke et al. | |
| 4,067,095 A | 1/1978 | Cameron | |
| 4,067,359 A | 1/1978 | Kwast | |
| 4,134,421 A | 1/1979 | Cameron | |
| 4,974,629 A | 12/1990 | Chang | |
| 5,105,847 A | 4/1992 | Wood | |
| 5,584,321 A | 12/1996 | Hargreaves et al. | |

FOREIGN PATENT DOCUMENTS

| | | |
|---|---|---|
| DE | 19952610 A1 * | 5/2000 |
| DE | 102 61 120 | 7/2004 |
| EP | 0 369 570 | 5/1990 |
| FR | 1 505 861 A | 12/1967 |
| FR | 2786242 | 5/2000 |
| GB | 321340 | 11/1929 |
| GB | 2 297 605 A | 8/1987 |
| JP | 60-215181 | 10/1985 |

OTHER PUBLICATIONS

Communication Relating to the Results of the Partial International Search for PCT/US2008/060718, mailed Sep. 3, 2008.

International Search Report for PCT/US2008/060718, mailed Jan. 26, 2009.

Examination Report for GCC/P/2008/10633, dated Jul. 20, 2011.

English language translation of a First Office Action for Chinese Application No. 200880012543.8 mailed on Dec. 21, 2010.

* cited by examiner

SLAM SHUT SAFETY DEVICE

RELATED APPLICATIONS

This application claims the benefit of U.S. Provisional Application No. 60/925,599, filed Apr. 20, 2007, the entirety of which is hereby incorporated by reference. This application claims foreign priority benefit to French Patent Application No. FR0754624, filed Apr. 20, 2007, the entirety of which is hereby incorporated by reference.

BACKGROUND

1. Field of the Disclosure

The disclosure generally relates to safety devices for gas distribution systems, and specifically relates to slam-shut type safety valves.

2. Related Technology

Gas distribution systems, in particular natural gas distribution systems, typically transport gas from a producer to a consumer along a series of pipes and through a series of valves. Each gas distribution system may include one or more regulator valves that control the pressure of the gas within the distribution system. Normally, the gas is transmitted at a high pressure through the system. However, the pressure of the gas must be reduced prior to final distribution to the consumers. This pressure reduction is typically accomplished at pressure reducing stations within local networks.

Typically, these pressure reducing stations include one or more pressure regulating valves and some sort of safety device to shut off the flow of gas should the pressure regulating valve fail. Most commonly, slam-shut safety valves are used for this purpose. For example, U.S. Pat. No. 4,134,421, which is hereby incorporated by reference, discloses a slam-shut safety valve that provides overpressure protection in a pipeline. The slam-shut safety valve is generally disposed upstream of the pressure regulating valve so that the slam-shut valve may prevent gas from reaching the pressure regulating valve in the event of a pressure regulating valve failure. The slam-shut safety valve monitors gas pressure downstream of the pressure regulating valve for maximum and minimum pressure tolerances. If the downstream pressure exceeds either the maximum or minimum tolerance, the slam-shut safety valve closes, cutting off the flow of gas to the pressure regulating valve and preventing an uncontrolled leak of gas due to the pressure regulating valve failure.

SUMMARY OF THE DISCLOSURE

A slam-shut safety device for a gas distribution system includes a valve body, an upper casing attached to the valve body, the upper casing housing two springs. The two springs are co-axially located and separated by a casting tube. The two springs are attached to a movable diaphragm that is exposed on one side to gas system pressure. A snap ring flange is attached to the valve body, the snap ring flange being adapted to secure the safety device to a main regulator in the gas distribution system. The valve body includes a cam mounted within the valve body. A limit switch is directly connected to the cam such that the limit switch moves directly in response to movement of the diaphragm. A reset pin extends from the valve body and interacts with the cam such that the cam may be reset from a closed position to an open position by moving the reset pin.

BRIEF DESCRIPTION OF THE DRAWINGS

Objects, features, and advantages of the present invention will become apparent upon reading the following description in conjunction with the drawing figures, in which.

DETAILED DESCRIPTION

Figure 1:
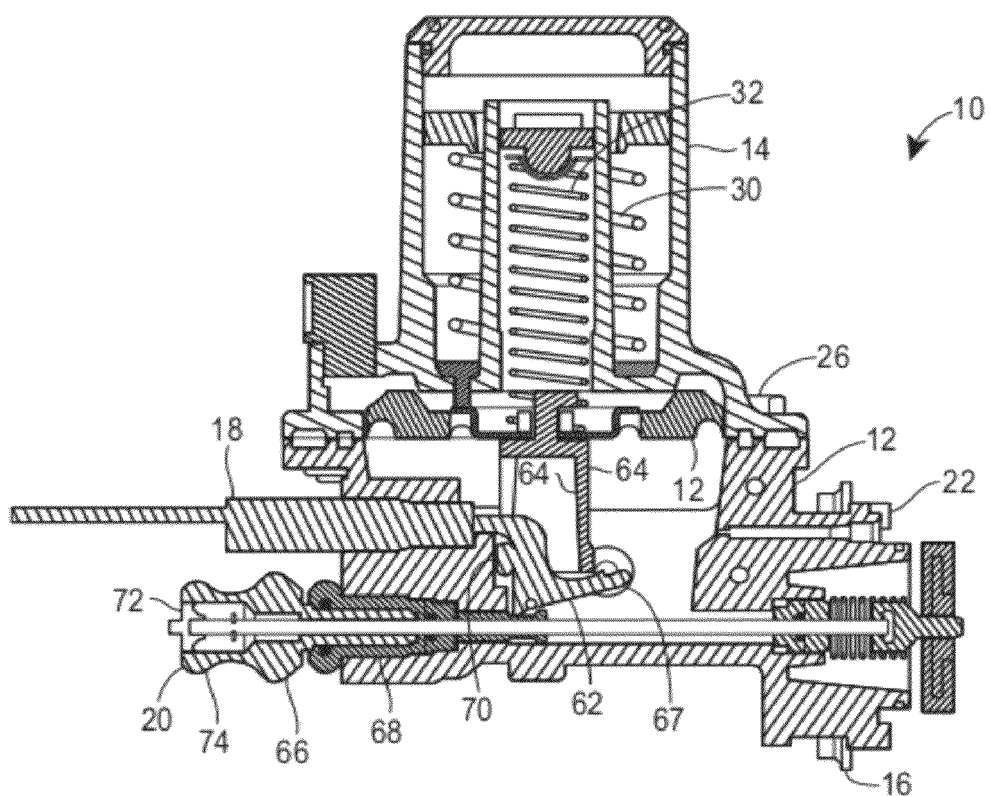
FIG. 1 is a perspective view of a slam shut safety device constructed in accordance with the teachings of the disclosure.

Turning now to the figures, FIG. 1 illustrates a slam shut safety device 10 constructed in accordance with the teachings of the disclosure. In particular, the slam shut safety device 10 is attached to a main regulator (not shown) in a gas distribution system. The slam shut safety device 10 includes a valve body 12, an upper case 14 attached to the valve body, a snap ring flange 16 mounted to one side of the valve body 12, a limit switch 18, and a reset pin 20 protruding from the valve body. The slam shut safety device 10 is attached to the main regulator (not shown) via fasteners 22. Likewise, the upper case 14 is attached to the valve body 12 with fasteners 26. The fasteners 22, 26 may be bolts, rivets, screws, or virtually any other type of fastener appropriate for attaching one component to another component.

Figure 2:
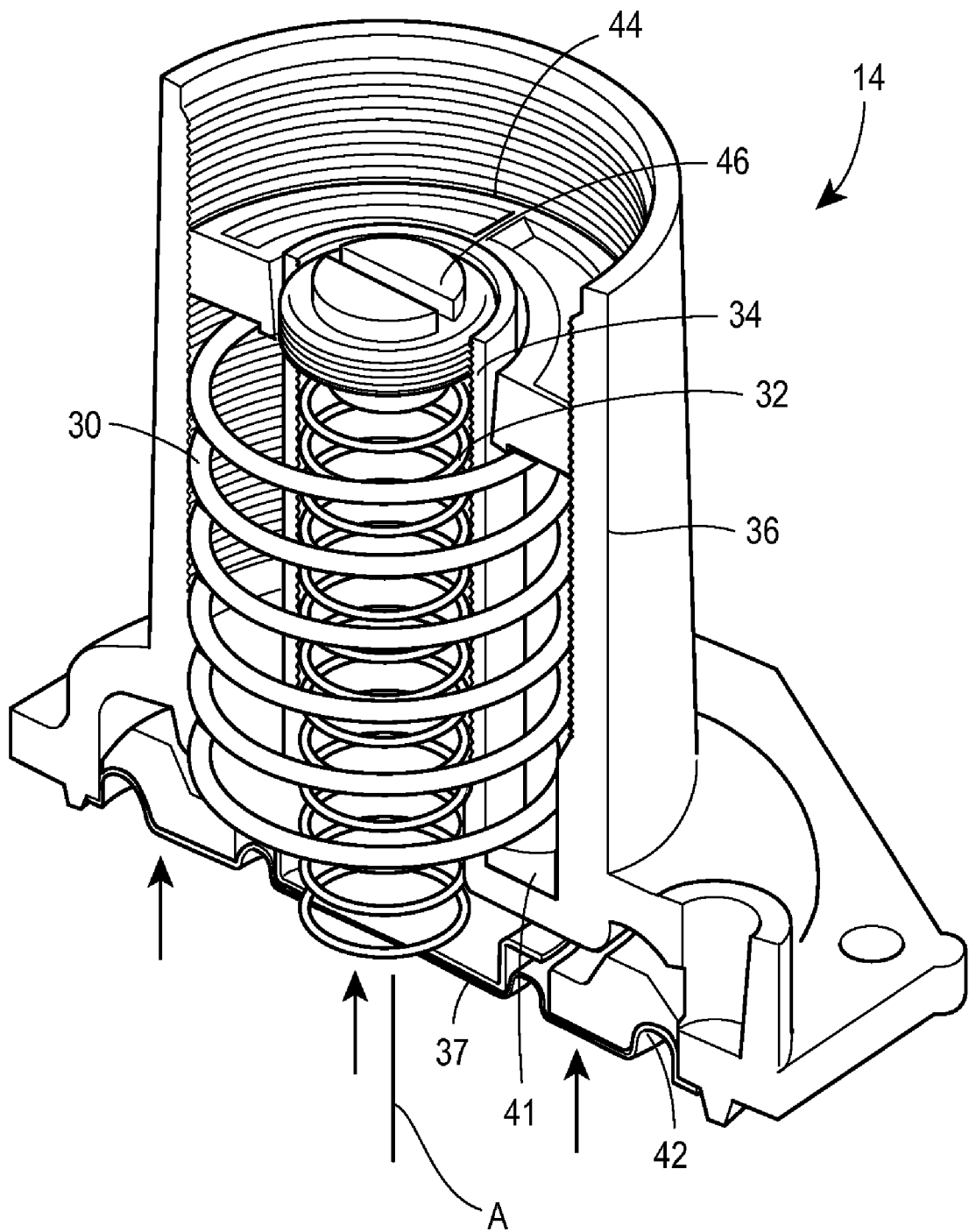
FIG. 2 is a cutaway view of an upper case of the slam shut safety device shown in FIG. 1.

The upper case 14 (FIG. 2) houses an overpressure spring 30 and an underpressure spring 32. The underpressure spring 32 determines the lower (minimum) acceptable gas pressure in the gas distribution system. Similarly, the overpressure spring 30 determines the upper (maximum) acceptable gas pressure in the gas distribution system. Both the overpressure and underpressure springs 30, 32 are disposed within the upper case 14 in a generally co-axial configuration (i.e., central axes of the two springs are co-located). However, the springs need not be axially co-located and the springs may be axially offset from one another. An inner casting tube 34 separates the overpressure spring 30 from the underpressure spring 32. An outer casting tube 36 surrounds the overpressure spring 30 and protects both the overpressure spring 30 and the underpressure spring 32 from environmental factors. The underpressure spring 32 is coupled at one end to a diaphragm plate 37, and the overpressure spring is coupled at one end to an overpressure ring 41. The overpressure ring 41 may be coupled to the diaphragm plate 37. Both the diaphragm plate 37 and the overpressure ring 41 may be attached to a diaphragm 42, which will be discussed in further detail below. The diaphragm 42 is exposed on one side to system pressure, and on another side the diaphragm 42 is exposed to spring forces from the overpressure spring 30 and the under pressure spring 32. A portion of the diaphragm 42 is movable and displaceable into an interior portion of the valve body 12 or the upper case 14, depending on system pressure along axis A.

Axis A is substantially parallel to or with coaxial with the central axes of the overpressure spring 30 and the underpressure spring 32.

At ends opposite the diaphragm 42, the overpressure spring 30 and the underpressure spring 32 contact or are seated against an overpressure adjustment cap 44 and an underpressure adjustment cap 46, respectively. The overpressure adjustment cap 44 and the underpressure adjustment cap 46 are displaceable along axis A towards and away from the diaphragm 42. In one embodiment, the overpressure adjustment cap 44 and the underpressure adjustment cap 46 may be threadedly engaged with the outer and inner casting tubes 36, 34, respectively. In particular, the overpressure cap 44 may be threadedly engaged to either an inner surface of the outer casting tube 36, or an outer surface of the inner casting tube 34. The underpressure cap 46 may be threadedly engaged with an inner surface of the inner casting tube 34. Both the underpressure cap 46 and the overpressure cap 44 are movable along axis A to adjust spring tension of the overpressure spring 30 and the underpressure spring 32 on the diaphragm plate 37. The distance between the adjustment caps 44, 46 and the diaphragm plate 37 determines the overpressure and underpressure set points for the slam-shut safety device 10. The central axes of the overpressure spring 30 and the underpressure spring 32 are located on the same side of the diaphragm 42, in contrast to traditional slam-shut valves. Locating both the overpressure spring 30 and the underpressure spring 32 on the same side of the diaphragm 42 facilitates adjustment of both the overpressure spring 30 and the underpressure spring 32 from outside of the valve. Moreover, adjustments to the overpressure spring 30 and the underpressure spring 32 may be made independently of one another. In other words, a user may adjust the overpressure spring 30 only, without affecting the underpressure spring 32, or vice versa. In conventional slam shut valves, where the overpressure and underpressure springs are disposed on opposite sides of the diaphragm, an adjustment to one spring affects the tension of the other spring, such that neither spring may be adjusted independently of the other. Furthermore, in at least one embodiment, the co-axial locations of the overpressure spring 30 and the underpressure spring 32 produces a compact upper case 14, which is advantageous for installation in tight or limited space locations.

Figure 3A:
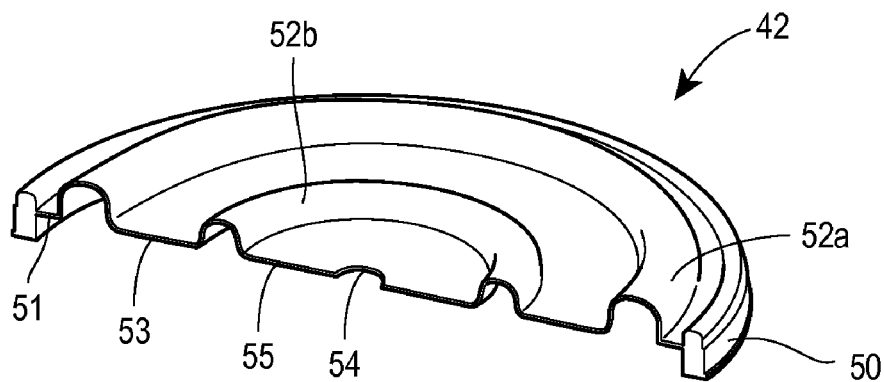
FIG. 3A is a sectional view of a diaphragm that is disposed between the upper case and the valve body of the slam shut safety device of FIG. 1.
Figure 3B:
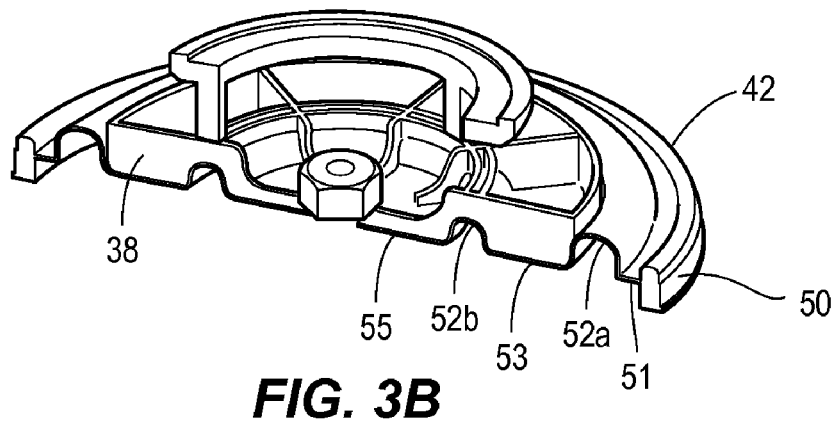
FIG. 3B is a sectional view of the diaphragm of FIG. 3A in a low pressure configuration.
Figure 3C:
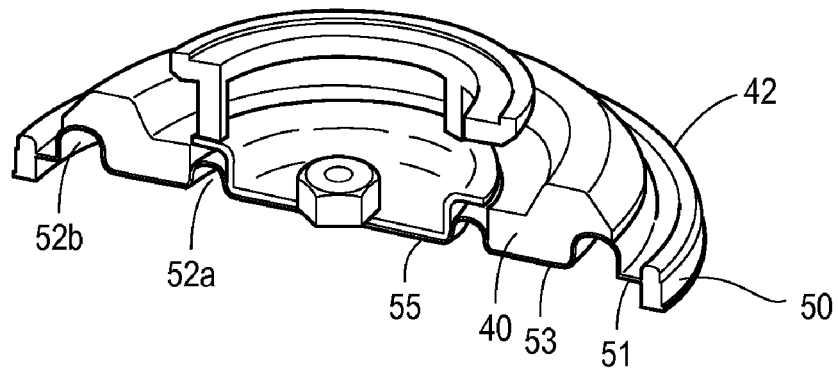
FIG. 3C is a sectional view of the diaphragm of FIG. 3A in a high pressure configuration.

The diaphragm 42 (FIGS. 3A, 3B, 3C) includes an outer o-ring 50 for sealing the upper case 14 with the valve body 12. The diaphragm 42 also includes first and second concentric convolutions 52a and 52b. Separating the o-ring 50 and the first convolution 52a is an outer planar region 51. Separating the first convolution 52a and the second convolution 52b is a middle planar region 53, and separating the second convolution 52b and a central opening 54 is an inner planar region 55. The first and second convolutions 52a, 52b allow a single diaphragm 42 to be used in both a low pressure configuration and a high pressure configuration. The low pressure configuration is shown in FIG. 3B and the high pressure configuration is shown in FIG. 3C. The central opening 54 may receive a fastener (such as a bolt) when attaching the diaphragm 42 to the diaphragm plate 37. Thus, the diaphragm 42 reduces manufacturing costs by being adapted to be used in both high pressure configurations and low pressure configurations. Additionally, inventory management is enhanced because only one diaphragm needs to be stored and higher order volumes are attained due to the reduced number of stocked parts.

The low pressure configuration includes a low pressure diaphragm plate 38, which is a rigid plate that covers the inner convolution 52b, the inner planar region 55, and the middle planar region 53 (FIG. 3B), while allowing the outer convolution 52a and the outer planar region 51 to remain movable. Likewise, the high pressure configuration includes a high pressure diaphragm plate 40, which is a rigid plate the covers the outer convolution 52a and the middle planar region 53 (FIG. 3C), while allowing the inner convolution 52b, the inner planar region 55 and the outer planar region 51 to remain movable. In this manner, the low pressure diaphragm plate 38 and the high pressure diaphragm plate 40 determine which part of the diaphragm 42 remains movable and which part of the diaphragm is prevented from moving.

Figure 4:
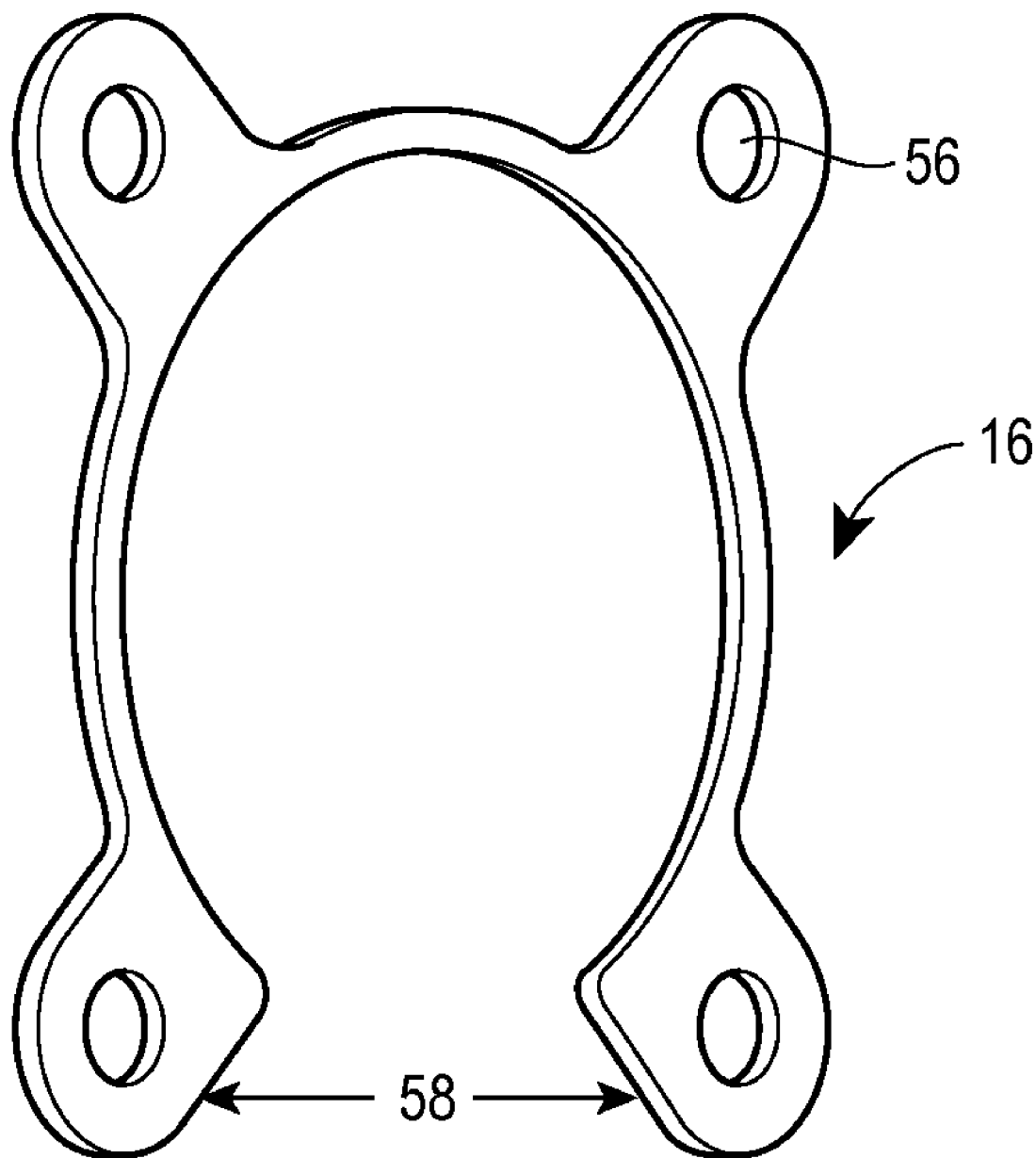
FIG. 4 is a perspective view of a snap ring flange used to secure the slam shut safety device of FIG. 1 to a main regulator valve.

The slam shut safety device 10 is attached to a main regulator (not shown) via a snap ring flange 16 (FIG. 4). The snap ring flange 16 includes a plurality of openings 56 for receiving fasteners 22. Further, the snap ring flange 16 includes an opening 58 along one edge. The opening 58 allows for quick installation because the opening 58 may be deformed and expanded to facilitate installation. The symmetrical nature of the snap ring flange 16 allows the slam shut safety device 10 to be attached to the main regulator (not shown) in virtually any orientation without compromising venting and water drainage.

Turning again to FIG. 1, the valve body 12 includes the limit switch 18 that is attached to a rotatable cam 62, the cam 62 including three cam arms 63a, 63b, 63c. The cam 62 is connected to the diaphragm 42 via a plunger 64 at the first cam arm 63a. The plunger 64 includes a plunger arm 65 extending downward. The plunger arm 65 is connected to the cam 62 at a connection point 67 on the first cam arm 63a that is offset from a pivot axis of the cam 62. As the plunger 64 moves upward in response to an overpressure condition which is strong enough to overcome the force produced by the overpressure spring 30, the cam 62 rotates counterclockwise (in this embodiment). As the cam 62 rotates, a latch connected to the first cam arm 63a is released and the slam-shut plug 69 moves to a closed position shutting off the gas supply to the main regulator. In response to an under pressure condition, in which the spring force of the underpressure spring 32 overcomes the system gas pressure, the plunger 64 moves downward causing the cam 62 to rotate in a clockwise direction. After a predetermined amount of rotation, the latch connected to the first cam arm 63a is released and the slam-shut plug 69 moves to the closed position shutting off the gas supply to the main regulator. The limit switch 18 detects movement of the diaphragm 42 through rotation of the cam 62 because the limit switch 18 is directly linked to the cam 62 by the second cam arm 62b, which is linked to the diaphragm 42 by the cam 62 and the plunger 64. In this manner, the limit switch 18 moves longitudinally in response to small variations in pressure, thus detecting diaphragm 42 movement, even if a reset pin assembly 66 is damaged.

Figure 5A:
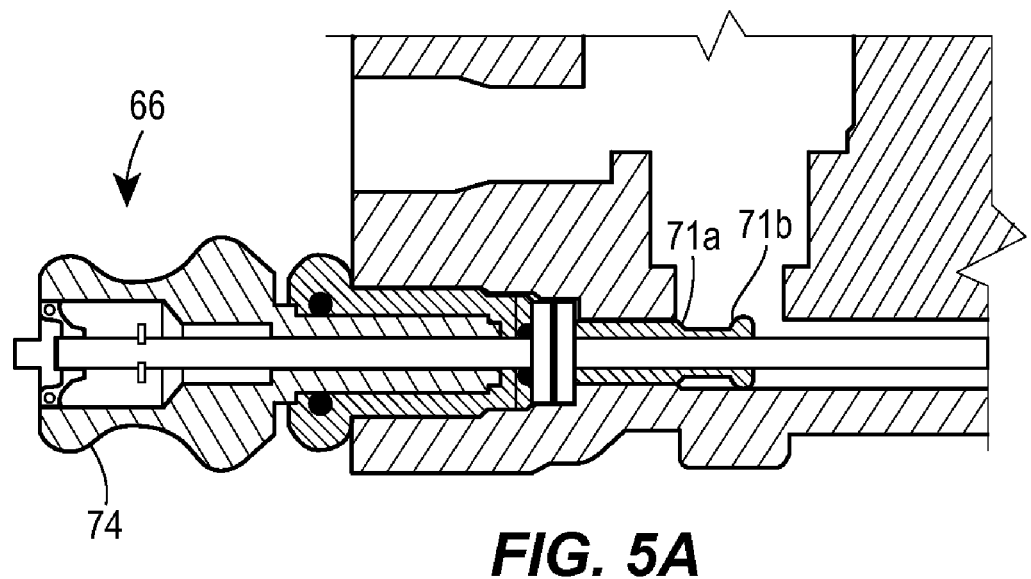
FIG. 5A is a cutaway elevational view of the valve body of the slam shut safety device of FIG. 1, specifically highlighting a reset pin in a reset position.
Figure 5B:
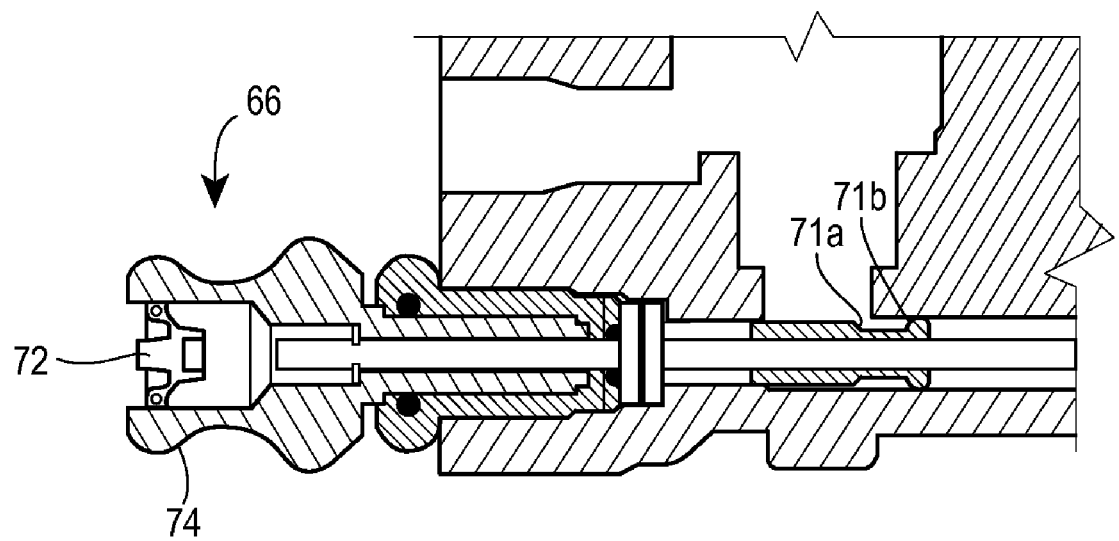
FIG. 5B is a cutaway elevational view of the valve body of the slam shut safety device of FIG. 1, specifically highlighting the reset pin in a relatch position.

The valve body 12 also includes the reset pin assembly 66 for relatching the cam 62. The reset pin assembly 66 includes a reset rod 68, a relatch plug 70, a travel indicator 72 (FIGS. 5A, 5B), and a reset sleeve 74. The reset rod 68 is slidable in the reset sleeve 74 in response to an interaction between the relatch plug 70 and the cam 62 at the third cam arm 63c. As the cam 62 rotates in response to movement of the diaphragm 42, the third cam arm 63c contacts a first shoulder 71a of the relatch plug 70 and forces the relatch plug 70 outward (to the left in FIGS. 1, 5A, and 5B). This, in turn, moves the reset rod 68 outward, and the reset rod 68 contacts the travel indicator 72 (FIGS. 5A and 5B). The travel indicator 72 may be formed of a resilient, deformable material. When the reset rod 68 contacts the travel indicator 72, a center portion of the travel indicator 72 is deformed outward (as shown in FIG. 5A), thereby producing a visual and tactile indication that the cam 62 has rotated in response to an over or under pressure condition. The travel indicator 72 provides protection from water or other environmental factors by forming a seal between within the reset sleeve 74, thereby protecting the reset rod 68.

Once the over/under pressure condition is corrected, the reset pin assembly 66 may be used to relatch the cam 62. A user may displace one end of the reset rod 68 (the end disposed in the travel indicator) towards the interior of the valve body 12. In doing so, the relatch plug 70 may also be displaced and a second shoulder 71b of the relatch plug 70 may contact the third cam arm 63c, thereby forcing the cam 62 to rotate into the relatched position.

While certain representative embodiments and details have been shown for purposes of illustrating the invention, it will be apparent to those skilled in the art that various changes in the methods and apparatus disclosed herein may be made without departing from the scope of the invention.

The invention claimed is:

1. A slam-shut safety valve for a gas distribution system, the slam-shut safety valve comprising:
   a valve body;
   an upper case mounted to the valve body;
   a diaphragm disposed between the valve body and the upper case, at least part of the diaphragm being displaceable into an interior portion of the valve body and into an interior portion of the upper case, the diaphragm having a first side being exposed to gas system pressure, an outer o-ring, an outer planar portion, an outer convolution, a middle planar portion, an inner convolution, and an inner planar portion;
   a first spring and a second spring disposed within the interior of the upper case, the first spring and the second spring exerting spring forces on a second side of the diaphragm opposite the gas system pressure; and
   a plunger connected to the first side of the diaphragm, the plunger being adapted to activate a cam to release a slam shut plug,
   wherein the outer and inner convolutions are co-centered and a plate is connected to the diaphragm, the plate covering the outer convolution and the middle planar portion while leaving the inner convolution, the outer planar portion and the inner planar portion uncovered.

2. The slam-shut safety valve of claim 1, wherein longitudinal axes of the first and second springs are co-located.

3. The slam-shut safety valve of claim 1 further comprising a cam, the cam including a first cam arm that contacts a plunger and second and third cam arms, the third cam arm being adapted to contact a reset pin, the reset pin being movable into and out of the valve body.

4. The slam-shut safety valve of claim 3 wherein the reset pin includes a reset plug at one end, the reset plug comprising a first shoulder that is adapted to contact the third cam arm.

5. The slam-shut safety valve of claim 4, wherein a travel indicator is mounted at a second end of the reset pin, the travel indicator being movable with the reset pin from an extended position that indicates a latch is released to a retracted position that indicates the latch is engaged.

6. The slam-shut safety valve of claim 5 wherein the travel indicator is formed from a resilient material.

7. The slam-shut safety valve of claim 3 wherein the second arm is adapted to contact a limit switch, the limit switch moving longitudinally in response to rotation of the cam.

8. The slam-shut safety valve of claim 1 comprising a snap ring flange mounted on an outside of the valve body, the snap ring flange being adapted to secure the slam-shut safety valve to a control valve, the snap ring flange including an opening along one edge.

9. The slam-shut safety valve of claim 8 wherein the opening allows the snap ring flange to deform during mounting.

10. The slam-shut safety valve of claim 1 comprising a first adjustment cap disposed at an end of the first spring opposite the diaphragm.

11. The slam shut safety valve of claim 10 wherein the first adjustment cap is threadedely secured to an upper casing and the first adjustment cap is displaceable along a first spring axis, displacement of the first adjustment cap changing the amount of spring force on the diaphragm generated by the first spring.

12. The slam-shut safety valve of claim 10 comprising a second adjustment cap disposed at an end of the second spring opposite the diaphragm.

13. The slam-shut safety valve of claim 12 wherein the second adjustment cap is threadedely secured to the upper casing and the second adjustment cap is displaceable along a second spring axis, displacement of the second adjustment cap changing the amount of spring force on the diaphragm generated by the second spring.

* * * * *